United States Patent [19]

Ohshima et al.

[11] 4,216,494
[45] Aug. 5, 1980

[54] TELEVISION CAMERA WITH BIAS LIGHT

[75] Inventors: Shigeru Ohshima; Takeshi Sekiguchi, both of Tokyo, Japan

[73] Assignee: Canon Kabushiki Kaisha, Tokyo, Japan

[21] Appl. No.: 13,565

[22] Filed: Feb. 21, 1979

[30] Foreign Application Priority Data

Feb. 21, 1978 [JP] Japan .................................. 53-18718

[51] Int. Cl.² .............................................. H04N 9/09
[52] U.S. Cl. ........................................ 358/55; 358/223
[58] Field of Search .................... 358/50, 52, 55, 57, 358/223, 225

[56] References Cited

U.S. PATENT DOCUMENTS

| | | | |
|---|---|---|---|
| 3,767,846 | 10/1973 | Okubo | 358/225 |
| 3,824,004 | 7/1974 | Dol | 358/55 |
| 4,031,551 | 6/1977 | Nobutoki | 358/223 |
| 4,080,624 | 3/1978 | Ando | 358/217 |
| 4,085,419 | 4/1978 | Sekiguchi | 358/223 |
| 4,123,777 | 10/1978 | Sekiguchi | 358/55 |
| 4,145,722 | 3/1979 | Takeuti | 358/223 |

*Primary Examiner*—Richard Murray
*Assistant Examiner*—Michael A. Masinick
*Attorney, Agent, or Firm*—Fitzpatrick, Cella, Harper, Scinto

[57] ABSTRACT

A television camera provided with a biased light source device disposed outside of the light path extending from the picture taking lens to the image pickup surface. The biased light source device has an elongated shape and such illumination distribution that the intensity of light emitted from the device is gradually reduced toward the central portion from the marginal portions in the longitudinal direction so that the image pickup surface may be uniformly illuminated with respect to the direction corresponding to the longitudinal direction of the biased light source device.

2 Claims, 25 Drawing Figures

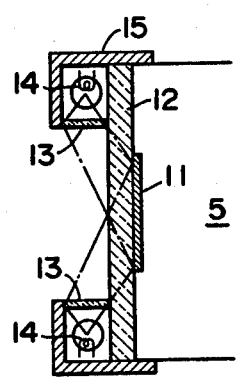
FIG. 2(a)
PRIOR ART
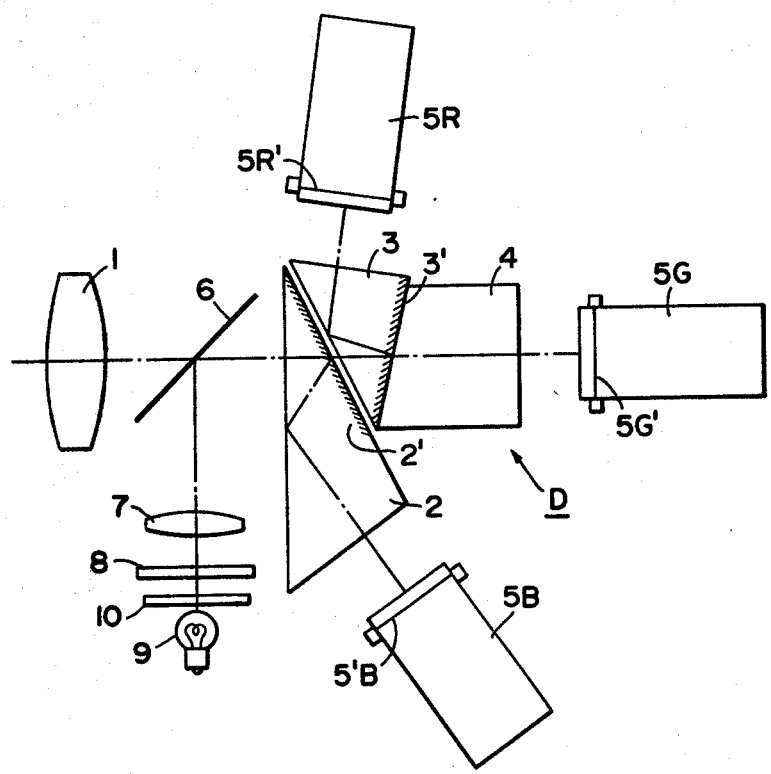
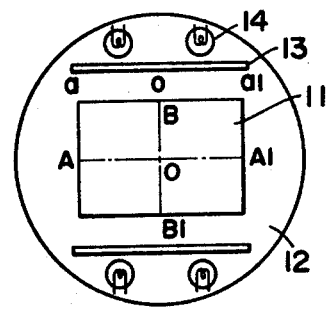
FIG. 2(b)
PRIOR ART
FIG. 1
PRIOR ART
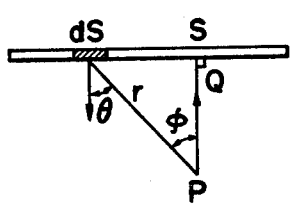
FIG. 3
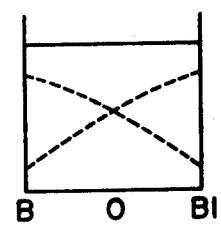
FIG. 4(a)
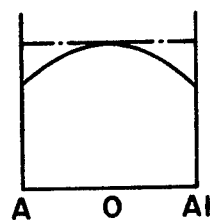
FIG. 4(b)
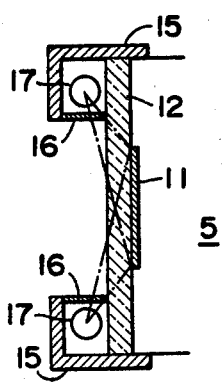
FIG. 5(a)
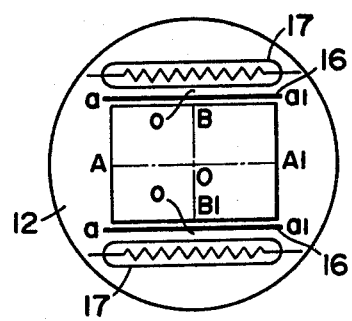
FIG. 5(b)
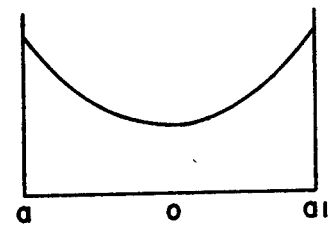
FIG. 6

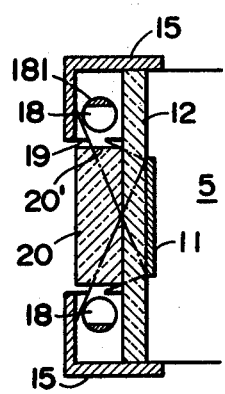
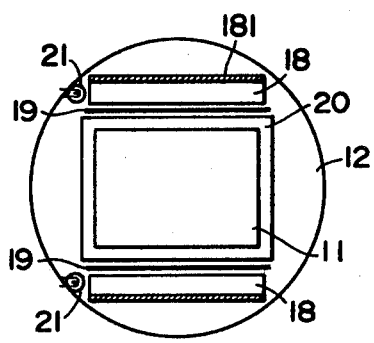
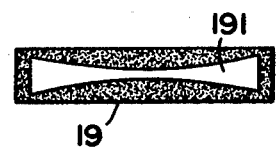
FIG. 7(a)  FIG. 7(b)  FIG. 8
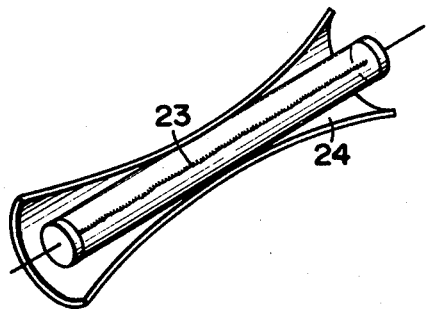
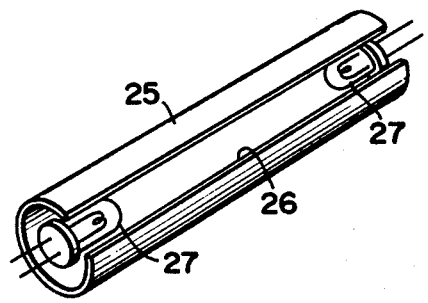
FIG. 9  FIG. 10
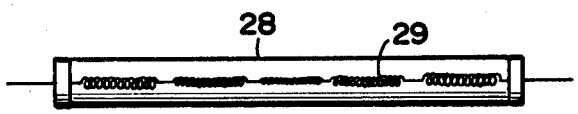
FIG. 11
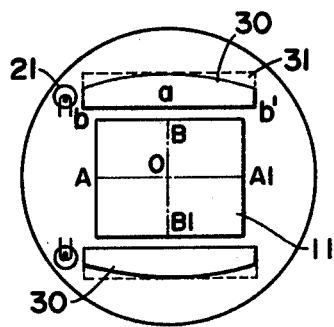
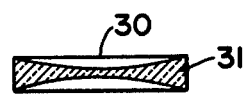
FIG. 12(a)  FIG. 12(b)

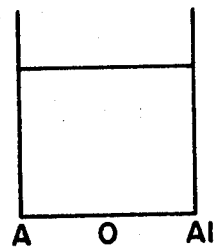
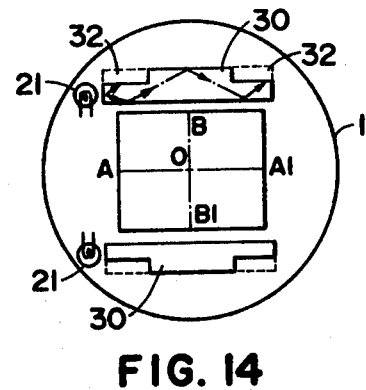
FIG. 13　　　　　FIG. 14
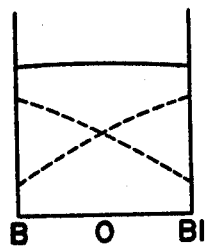
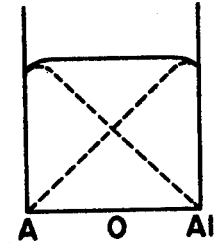
FIG. 15(a)　　　FIG. 15(b)
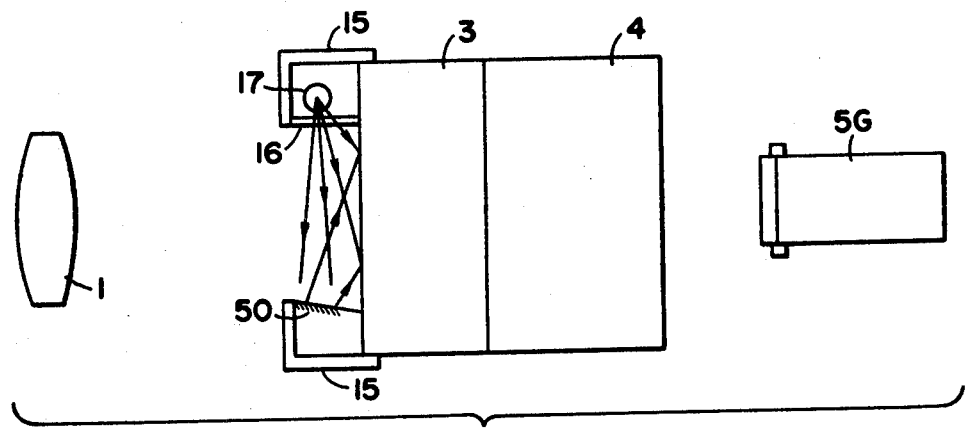
FIG. 16
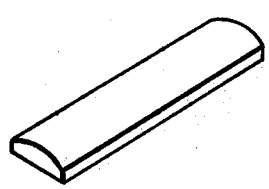
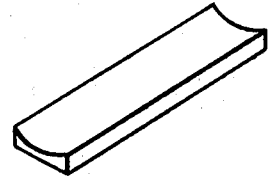
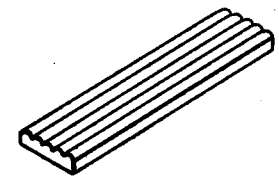
FIG. 17(a)　　FIG. 17(b)　　FIG. 17(c)

TELEVISION CAMERA WITH BIAS LIGHT

BACKGROUND OF THE INVENTION

1. Field of the Invention

The present invention relates to television cameras and more particularly relates to television cameras provided with a biased light source device.

2. Description of the Prior Art

In television cameras there are generally used such image pickup tubes whose photoconductive surface (image pickup surface) is formed using PbO, $As_2Se_3$, CdSe or other photoconductive material. However, these image pickup tubes have some problems in respect to response speed at rising response and afterimage by which the effective sensitivity of television the camera is limited. For example, when a moving object under a condition of low illumination is picked up by such image pickup tube, there is caused by the above mentioned unsatisfactory characteristics of rising response and after-image such unfavorable phenomenon that the picture appearing on the screen of the image receiving tube becomes vague or tailed.

It is known that the above problem can be solved to some extent by illuminating the photoconductive surface of the image pickup tube uniformly and at low illuminance using additional illuminating means particularly provided in addition to the imaging light of the object. This method is generally referred to as a bias lighting method and has been acknowledged to be a most effective method for reducing the difficulties of the known image pickup tubes.

As an example, U.S. Pat. No. 3,767,846 and U.S. Pat. No. 3,824,004 have disclosed television cameras comprising a biased light source device disposed outside of the light path extending from the picture taking lens to the image pickup surface.

In the bias lighting system hitherto used, the bias light is usually made incident upon the image pickup surface in two opposed directions to illuminate it as uniformly as possible. But, this manner of illumination can not assure a uniform illumination of the image pickup surface in all directions. Although the image pickup surface may be illuminated uniformly only in the two opposed directions, no uniform illumination is attainable with respect to the direction along the length of the biased light source device.

BRIEF SUMMARY OF THE INVENTION

Accordingly, it is a general object of the invention to provide a television camera which assures the uniformity of illumination of the image pickup surface also in the direction along the length of the biased light source device.

To attain the object according to the invention, the biased light source device is so designed as to have such illumination distribution in which the illumination at the central portion is reduced as compared with that at the marginal portions.

Other and further objects, features and advantages of the invention will appear more fully from the following description taken in connection with the accompanying drawing wherein:

BRIEF DESCRIPTION OF THE DRAWING

FIG. 1 schematically shows the optical system of a color television camera provided with a bias lighting means according to the prior art;

FIGS. 2(a) and 2(b) schematically show another bias lighting means according to the prior art;

FIG. 3 illustrates the illumination attained by the prior art bias lighting means;

FIGS. 4(a) and 4(b) are illumination distribution curves obtained therefrom;

FIGS. 5(a) and 5(b) illustrate an example of a filter used for correcting the distribution of illumination in accordance with the principle of the present invention;

FIG. 6 is a characteristic curve showing the transmittivity of the filter;

FIGS. 7(a) and 7(b) are views similar to FIGS. 5(a) and 5(b), but showing a modification thereof;

FIG. 8 is a front view of the light projection window used in the modification;

FIG. 9 is a perspective view of another embodiment of the invention in which a reflector the reflection area of which varies along its length is used;

FIG. 10 shows a further embodiment of the invention in which a cylindrical reflector is used together with light sources provided at the both ends;

FIG. 11 shows still a further embodiment of the invention in which a cylindrical light source is used and the light emitting filament of the light source is particularly designed so as to give the desired distribution of illumination;

FIGS. 12(a) and 12(b) show another embodiment of the invention in which light transmission media whose brightening area varies along the length thereof are used;

FIG. 13 is the illumination distribution curve thereof;

FIG. 14 shows a modification of the embodiment shown in FIG. 12;

FIGS. 15(a) and 15(b) are illumination distribution curves obtained from the modification;

FIG. 16 is an explanatory view of a further embodiment of the invention; and

FIGS. 17(a), 17(b) and 17(c) illustrate various modifications of the mirror used in the embodiment shown in FIG. 16.

DESCRIPTION OF PREFERRED EMBODIMENTS

To assist in a better understanding of the invention, description will be made firstly of the prior art apparatus with reference to FIGS. 1 to 4.

FIG. 1 shows the optical system of a color television camera provided with a conventional bias light illumination system.

Designated by 1 is an objective lens which converts light comming from a not shown object into an imaging beam. Behind the objective lens 1 there is disposed a trichromatic color separation prism system D composed of three prisms 2, 3 and 4.

For color separation, the prisms 2 and 3 have dichroic films 2' and 3' respectively. The dichroic film 2' is, for example, of the type which reflects only the light of wavelength in the range of the color blue and allows light in other colors to pass through it whereas the dichroic film 3' reflects, for example, only red light and allows other lights to pass through it.

The imaging beam emerging from the object lens 1 is separated into the colors blue, green and red by the trichromatic color separation prism system D constituted by prisms 2, 3 and 4 and dichroic films 2' and 3'. Lights of the colors blue, green and red thus separated are then imaged on the photoconductive surfaces 5B", 5G" and 5R" of image pickup tubes 5B, 5G and 5R respectively. Each image pickup tube scans the light receiving surface under to action of coil means not shown and produces an electric signal corresponding to the image formed thereon.

Elements 6 through 10 constitute a bias lighting means which is of the type conventionally used in a television camera apparatus as shown in FIG. 1. 6 is a half mirror slantingly disposed on the optical axis of the objective lens 1, 7 is a lens for illumination, 8 is diffusing plate and 9 is a lamp. Designated by 10 is a filter whose function is to adjust the intensity of red, green and blue of the light emitted from the lamp 9 in accordance with the characteristics of the individual image pickup tubes. The lamp 9 illuminates the diffusing plate 8 through the filter 10. Light emerging from the diffusing plate 8 is thrown onto the light receiving surfaces 5B', 5G' and 5R' of the image pickup tubes through the lens 7, half mirror 6 and color separation prism system D.

The above described prior art apparatus shown in FIG. 1 has various disadvantages attributable to the arrangement of the bias lighting system used therein.

Since the half mirror 6 is slantingly disposed between the objective lens 1 and color separation prism system D, a considerable space is required therefor. This constitutes an obstacle against the minimization of the overall size of the television camera. Moreover, this makes it difficult to use an objective of short back-focus. Since a portion of the effective imaging beam is lost by the reflection on the half mirror 6, the virtual F number of the objective lens 1 is reduced and a corresponding reduction in sensitivity of the camera is caused thereby. The use of filter 10 has also some problem. With such filter, it is practically difficult to properly adjust the quantity of bias light directed to the image pickup tubes 5B for blue, 5G for green and 5R for red because of the general properties of the filter 10.

In order to eliminate the above disadvantages, it has been proposed to arrange light sources and light projection elements along the two opposed sides of the rectangular photoconductive surface of the image pickup tube. These light sources and light projection elements are positioned on the front surface side of the face plate of the image pickup tube and at such positions as not to interfere with the effective imaging beam comming from the objective lens. Light coming out from the projection elements is projected on the photoconductive surface as bias light to illuminate the surface.

The principle of this known bias lighting method is illustrated in FIGS. 2(a) and (b).

In FIG. 2, the image pickup tube is designated by 5 and the face plate is designated by 12. The face plate 12 is provided at the front side of the image pickup tube 5 and disposed opposed to an imaging optical system (not shown). The face plate has a film of photoconductive material 11 vapor-deposited on the inside surface of the plate. Through the objective lens, an image is formed on the photoconductive film surface 11 and the light image is converted into an electrical signal by a known coil assembly (not shown) disposed around the image pickup tube to scan the photoconductive surface by means of an electron beam. Designated by 14 is a light source which illuminates a diffusing plate 13. The diffusing plate 13 serves as a light projection element and illuminates the photoconductive surface 11. 15 is a shield frame member which prevents light emitted from the light source 14 from comming out into the exterior. To clearly show the positions of lamps (light sources 14), the shield frame members 14 are omitted in FIG. 2(b). As seen from the drawing of FIG. 2, two such illumination units each comprising two light sources 14 and one light projection element 13 are provided, one being at one long side of the surface 11 and another at the other long side of the surface and arranged symmetrically relative to the photoconductive surface 11.

When a surface is illuminated by a total diffuse plane light source, the distribution of illumination then obtained may be illustrated generally as in FIG. 3.

In FIG. 3, a light receiving surface P (11) is illuminated by a total diffuse plane light source S (13). For this case, the illumination E(P) on the surface P is given by the following formula:

$$E(P) = \int B \frac{\cos\theta \cos\phi}{\gamma^2} ds$$

wherein,
ds is a very small area on the source S,
B is brightness of the area ds,
$\gamma$ is distance between ds and P,
$\theta$ is the angle which the normal drawn from ds forms with the line segment ds-P, and
$\phi$ is the angle which the normal drawn from P forms with the line segments ds-P.

As clearly seen in FIG. 3, the distance $\gamma$ becomes the smallest and also the angles $\theta$ and $\phi$ become the smallest at the portion Q which corresponds to the foot of the normal drawn from the point P to the plane light source S. Therefore, at this portion Q, the contribution to the illumination at the point P becomes maximum. The more remote portion from the point Q will a lower contribution to the illumination at P since $\gamma$, $\theta$ and $\phi$ are all increased gradually with the increase of distance from the point Q.

For the case where a light receiving surface (11) is illuminated by two plane light sources (13) in two different directions as illustrated in FIG. 2, the illumination resulting therefrom will be given by calculating the illumination for one plane light source and that for another separately using the above formula, and then taking the sum of the two values.

Taking the above fact into consideration, let us now consider the distribution of illumination on the light receiving surface 11. With respect to the direction normal to the light projection element 13, for example, to the direction of $\overline{BOB1}$, one illumination unit 13, 14 at the one side of the surface will give such illumination distribution as represented by one of two dotted line curves shown in FIG. 4(a) and another unit at the other side will give such illumination distribution curve as represented by another dotted line curve also shown in FIG. 4(a). These two dotted line curves have the same form and the sum of the two illuminations gives a well balanced illumination as presented by the solid line curve shown in FIG. 4(a). This means that the surface can be almost uniformly illuminated by the two plane light sources in respect to the direction.

However, the distribution of illumination in the direction parallel with the light projection element 13 is different from that shown in FIG. 4(a). As an example, an illumination distribution curve obtained along the line $\overline{AOA1}$ which is in parallel with the light projection element 13 is shown in FIG. 4(b). As will be seen from the curve of FIG. 4(b), the quantity of light which the surface 11 can receive is maximum at the center O of the surface and is gradually decreased toward the edge points A and A'. This is because the distance $\gamma$ as well as the angles $\theta$ and $\phi$ become larger and larger with the increase of distance from the center O in the direction toward A or A'. As a result, the illumination distribution on the surface 11 in the direction of $\overline{AOA1}$ lacks uniformity. The central portion becomes the brightest area and the marginal portions of the surface become dark as will be understood from the curve of FIG. 4(b). Such an unbalanced illumination gives rise to a problem of shading which will give unpleasant pictures on the television screen. Therefore, it is desired to eliminate the unbalance of illumination in the direction parallel to the plane light source so as to minimize the shading of bias light.

The present invention has solved the problem in an effective manner. According to the invention, the above mentioned problem of shading involved in the known bias illumination system comprising light source(s) and light projection element(s) provided at the front side of the image pickup tube is solved by providing shading correction means which serve to gradually increase the quantity of light emitted from an elongated biased light source device from the central portion (minimum) to edge portions (maximum) along the length of the biased light source device.

Now, preferred embodiments of the invention will be described with reference to FIGS. 5 to 17 in which members and elements having the same functions as those in FIG. 2 are designated by the same reference numerals and characters.

In the first embodiment shown in FIG. 5, a cylindrical lamp with a long filament is used as light source 17. Two sets of such light sources are provided opposed to each other at the front side of an image pickup tube. The larger the light source is, the better uniformity of illumination is attainable. Therefore, it is advisable that the surface of the glass tube of each cylindrical lamp 17 be made of matted glass to have a light diffusing property. Designated by 16 is a filter having such transmissivity that the quantity of light transmitted through the filter is maximum at the both end portions and minimum at the center portion thereof and that the transmissivity is gradually decreased in the direction toward the center from both ends. The transmissivity characteristic curve shown in FIG. 6 is that which the filter 16 has to have.

Here, for the purpose of illustration, the distribution of illumination on the line $\overline{AOA1}$ parallel with the light projection element is considered. As previously noted, the light from the part a of the light projection element takes the maximum contribution to the illumination at the point A. Since the filter has the highest transmissivity at the part a, the insertion of the filter does not reduce the illumination at the point A so much. The reduction of quantity of light transmitted through the filter at the center portion O has no considerable effect on the illumination at the point A. This is the same for the point A1.

On the contrary, the illumination at the central portion O to which the light from the part o of the light projection element takes the maximum contribution, is remarkably reduced by the insertion of the filter whose transmissivity is minimum at the center portion. In this manner, the use of a filter having transmissivity characteristics as shown in FIG. 6 reduces the illumination at the central portion of the image surface so as to lessen the difference in illumination between the central portion and edge portions. The distribution of illumination obtainable with this embodiment is shown by the chain line curve in FIG. 4(b). It is evident from the curve that a well balanced bias illumination is attained by the present invention.

In determining the characteristics of filter actually used in the above embodiment, various complicated factors such as uniformity of brightness distribution of the light sources then used and lights reflected within the face plate must be taken into consideration. Therefore, the selection of filter should be done experimentally.

In order to adjust the quantity of light projected on the light receiving surface, such filter having an opening the width of which is gradually changed in a predetermined direction also may be used in place of the above described filter having a predetermined transmissivity gradient. Such modification is illustrated in FIG. 7.

In FIG. 7, the reference numeral 18 designates a light transmission medium which may be formed, for example, by covering a core member of high refractive index with cover material of low refractive index. The hatched portion 181 of the medium 18 is a portion cut off from the medium 18. When the light transmission medium 18 is illuminated by a lamp 21 at the one end thereof, the illumination light is transmitted through the medium while being total-reflected many times within the medium and is diffused upon the time of impinging upon the cut surface. The diffused light comes out from the medium through a surface opposed to the cut surface. Therefore, as a whole, the light transmission medium serves as a homogeneous light source.

19 is a light projection window having a particularly shaped opening. As seen best in FIG. 8, the opening is so shaped that its width is minimum at the center and is gradually increased toward both ends. This light projection window 19 is inserted between the above mentioned light transmission medium in the form of a rod 18 and a glass plate 20 serving as a flare prevention chip or low-pass filter. To prevent a shadow of the opening from appearing on the screen, it is required to provide a diffusion plate in the vicinity of the window. In case of the shown embodiment, side surfaces 20' of the glass plate are formed as mat surfaces to give the diffusion property required.

In this embodiment, therefore, the effective width of the bias light source is reduced at the central portion thereof, by which there is obtained almost the same shading correction effect as that in the first embodiment using a filter as described above.

For the same purpose of shading correction, other types of filter may be used within the scope of the invention. For example, a mesh type filter having such mesh density distribution that the quantity of light transmitted through it becomes minimum at the center or a ND glass filter the thickness of which is maximum at the center may be used. If such ND glass filter having different thicknesses along its length is used, a mating glass plate of the same refractive index as that of the ND glass filter is combined with the ND glass to make the thickness uniform as a whole.

FIG. 9 shows another embodiment of the invention in which a cylindrical light source 23 is used together with a particularly shaped reflector 24. The reflector 24 is disposed opposed to the surface of the image pickup tube relative to the light source 23. The area of reflection surface of the reflector 24 is minimum at the center and is gradually increased toward both ends along the length of the reflector symmetrically. Because of the reduced reflection area, the quantity of light reflected by the reflector at the central portion is remarkably reduced as compared with that at the end portions.

In the embodiment shown in FIG. 10, a cylinder 25 is used which has a light projection slit 26 cut away along its length at the side facing the photoconductive surface of the image pickup tube. The inside surface of the cylinder 25 is of diffuse reflection. Two small light sources 27 are inserted in the cylinder 25 with one light source being positioned at one end of the cylinder and another light source at another end. With this arrangement of bias light source, the quantity of light from both end portions is far larger than that from the central portion of the light projection slit 26. This is because the light from the end portions is composed mainly of direct light from the lamps 27 whereas the light from the central portion is composed of the reflected light by the inner surface of the cylinder.

FIG. 11 illustrates a further embodiment using also a cylindrical light source 28. This embodiment is featured by the particular form of light emitting filament enclosed in the cylindrical tube. The filament is formed in such manner that the quantity of light emitted therefrom is gradually increased toward both ends from the center of the length.

FIG. 12 shows another embodiment similar to that shown in FIG. 7. In this embodiment, also a light transmission medium 30 is used which is in the form of a rod. Different from that used in the embodiment shown in FIG. 7, this light transmission medium 30 has a curved cut-out portion 31 the width of which is gradually reduced toward the center from the ends. When this light transmission medium 30 is illuminated at its one end or both ends by light source(s) 21, a larger quantity of light is emitted from the end portions than that from the central portion since the brightening area is reduced at the central portion compared with that at the end portions. Therefore, the shading in the direction parallel with the light transmission medium is corrected so that there is obtained a uniform distribution of illumination in this direction as shown by the curve in FIG. 13 which is an illumination distribution curve along the line $\overline{AOA1}$.

According to the modification shown in FIG. 14, the light transmission medium 30 is cut-out only at both ends 32, 32 while the central portion remains uncut. When the light transmission medium 30 is illuminated at its end by a light source 3, light is emitted from only the end portions where cuttings have been made, and no light comes out from the central portion. The distribution of illumination obtained on the photoconductive surface is seen from the illumination curves shown in FIGS. 15(a) and (b). As to the direction normal to the light transmission medium 30, a uniform distribution of illumination is obtained as demonstrated by FIG. 15(a) showing the illumination distribution on the line $\overline{BOB1}$. As to another direction, that is, the direction parallel with the light transmission medium 30, the two cutout end portions 32, 32 give the dotted line curves in FIG. 15(b) respectively when illumination is measured on the line $\overline{AOA1}$. Sum of the two illuminations gives the solid line curve in FIG. 15(b) which demonstrates that also in the direction parallel with the light transmission medium there is attained an almost uniform distribution of illumination.

FIG. 16 shows another important embodiment which is different from other embodiments previously described in the point that only one single biased light source unit is used in the FIG. 16 embodiment, whereas other embodiments use two units. FIG. 16 is a view similar to FIG. 1, but the color separation prism system is viewed from above. 15 designates again a shield frame member which is mounted on the incidence surface of prism 2 (not shown in FIG. 16) at a position outside of the path of the imaging beam coming from the objective 1. Designated by 17 is an elongated light source and 16 is a filter as described above. In opposition to the filter 16 there is provided a tilted mirror 50. A portion of light emitted from the light source 17 directly enters the color separation prism system and then illuminates the image pickup tube 5G. Another portion of light from the source 17 is directed to the mirror 50 upon which the light is reflected toward the prism system to indirectly illuminate the image pickup tube 5G. The direction in which the reflected light enters the prism and that in which the direct light enters it are symmetrical relative to the optical axis. In the shown embodiment, the illumination light source 17 is provided on the incidence surface of the prism system. But, the light source may be mounted on another surface at a position close to the incidence surface. For example, it may be mounted on a surface orthogonal to the incidence surface and at a position in the vicinity of the latter as shown in U.S. Pat. No. 3,824,004. In this case, the reflection surface is preferably provided on a surface opposed to the surface on which the light source is mounted. While the mirror 50 has been shown to be in a form of plane mirror, the mirror may be of another shape. For example, a convex cylindrical reflection mirror (FIG. 17(a)), a concave cylindrical reflection mirror (FIG. 17(b)) or a lenticular reflection mirror (FIG. 17(c)) also may be used.

While the invention has been particularly shown and described with reference to preferred embodiments thereof, it will be understood by those skilled in the art that the foregoing and other changes in form and details can be made therein without departing from the spirit and scope of the invention.

What we claim is:

1. A television camera comprising:
    an objective lens;
    an image pickup apparatus having an image pickup surface on which an image of an object is formed through said objective lens; and
    at least one elongated biased light source device disposed outside of the optical path between said objective lens and said image pickup surface, the distribution of quantity of light emitted from said biased light source device along the length thereof being relatively low at the central portion as compared with both end portions.

2. A television camera comprising:
    an objective lens;
    a color separation optical system disposed in the optical path of said objective lens, said color separation optical system comprising an incidence surface opposed to said objective lens and a plural number of exit surfaces;
    a plural number of image pickup apparatus each of which has an image pickup surface opposed to the corresponding one of the exit surfaces of said color separation optical system; and at least one elongated biased light source device disposed in the vicinity of said incidence surface of said color separation optical system and outside of the optical path of said objective lens, the distribution of quantity of light emitted from said biased light source device along the length thereof being relatively low at the central portion as compared with both end portions.

* * * * *

UNITED STATES PATENT AND TRADEMARK OFFICE
CERTIFICATE OF CORRECTION

PATENT NO. : 4,216,494
DATED : August 5, 1980
INVENTOR(S) : SHIGERU OHSHIMA, et al.

It is certified that error appears in the above–identified patent and that said Letters Patent are hereby corrected as shown below:

Column 1, line 18, after "of" insert --the--; delete "the" (last occurrence).

Column 3, line 7, change "to" to --the--.

Column 4, line 38, insert --take-- after "will".

Column 7, line 22, insert --light-- before "from" (first occurrence).

Signed and Sealed this

Eleventh Day of November 1980

[SEAL]

Attest:

SIDNEY A. DIAMOND

Attesting Officer    Commissioner of Patents and Trademarks